United States Patent [19]

Clark

[11] 4,237,447

[45] Dec. 2, 1980

[54] SPEED INDEPENDENT SELECTOR SWITCH FOR DIGITAL COMMUNICATION NETWORKS

[75] Inventor: Becky J. Clark, Tualatin, Oreg.

[73] Assignee: Burroughs Corporation, Detroit, Mich.

[21] Appl. No.: 35,411

[22] Filed: May 2, 1979

[51] Int. Cl.³ ............................................. H04Q 9/00
[52] U.S. Cl. ............................ 340/147 T; 340/147 C; 179/18 FG
[58] Field of Search ......... 340/147 C, 147 T, 147 LP; 179/15 A, 18 FD, 18 FG; 307/244

[56] References Cited

U.S. PATENT DOCUMENTS

| | | | |
|---|---|---|---|
| 3,916,380 | 10/1975 | Fletcher et al. | 340/147 C |
| 4,032,893 | 6/1977 | Moran | 340/166 R |
| 4,071,908 | 1/1978 | Brophy et al. | 179/18 FG |
| 4,110,830 | 8/1978 | Krygowski | 179/15 A |
| 4,162,535 | 7/1979 | Anderson | 364/900 |
| 4,167,789 | 9/1979 | Faustini | 364/900 |

*Primary Examiner*—Donald J. Yusko
*Attorney, Agent, or Firm*—Mervyn L. Young; Kevin R. Peterson

[57] ABSTRACT

A speed independent selection switch designed for pipelined message transmission through digital communication networks. The selector routes a message from the input path to one of two output paths selected by the first bit of the message, that bit then being discarded.

4 Claims, 28 Drawing Figures

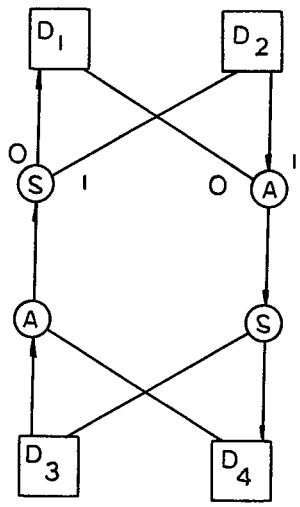
FIG. IA
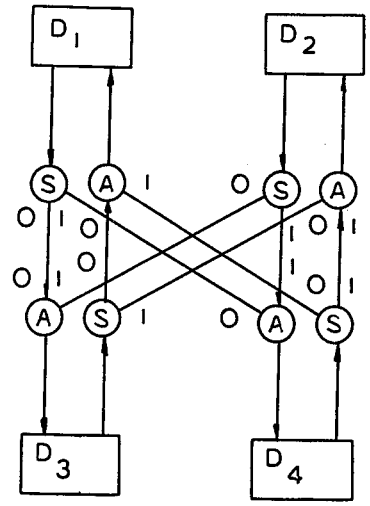
FIG. IB
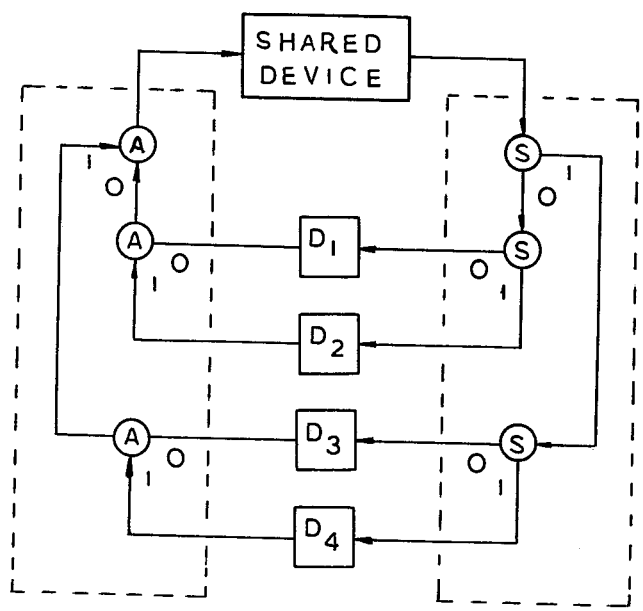
FIG. 2

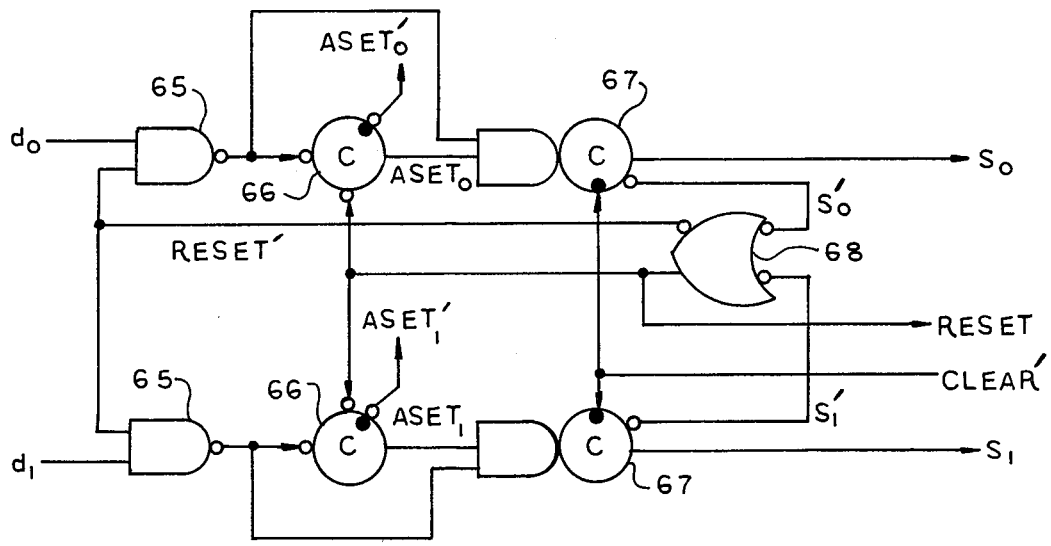
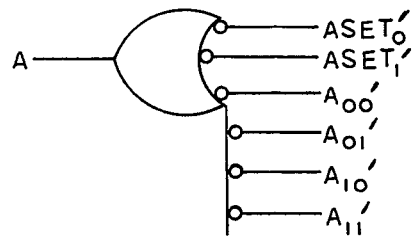
FIG. 13B
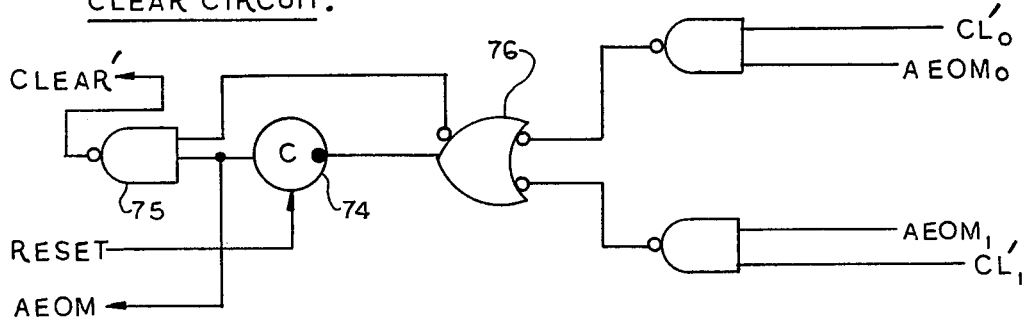
FIG. 13C

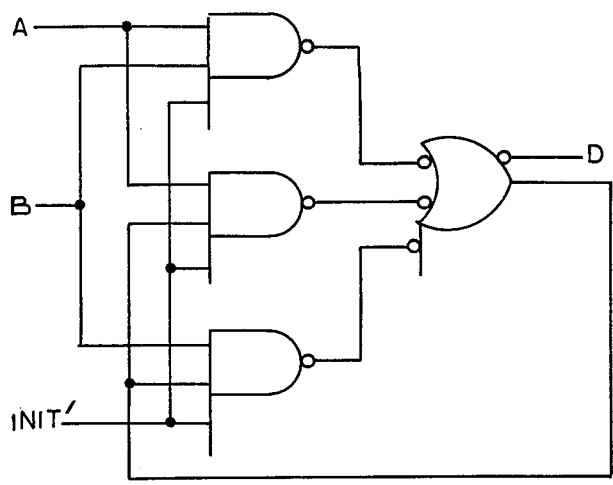
FIG.14A
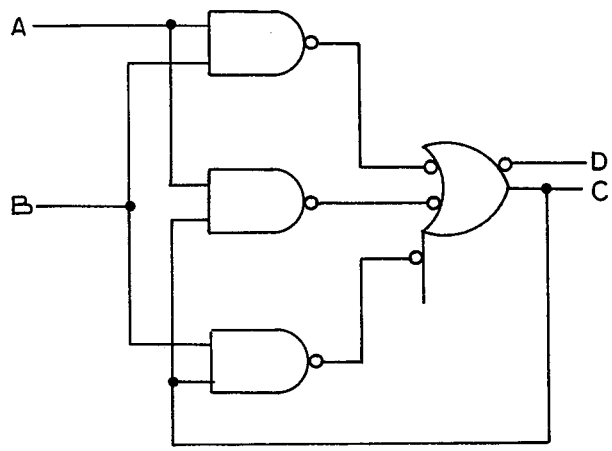
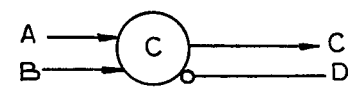
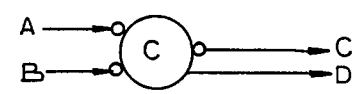
FIG.14B
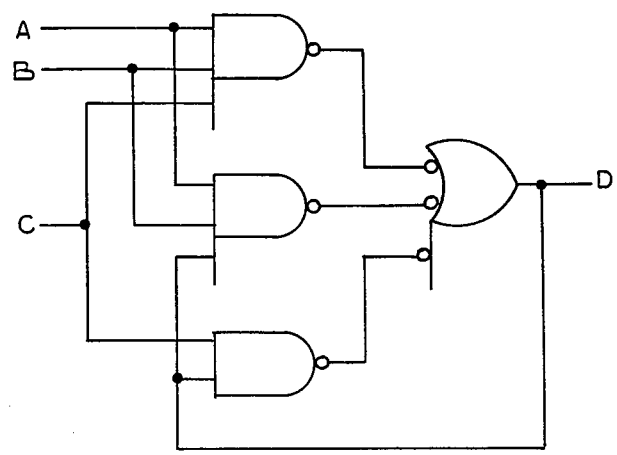
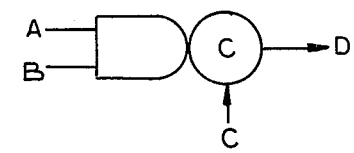
FIG.14C

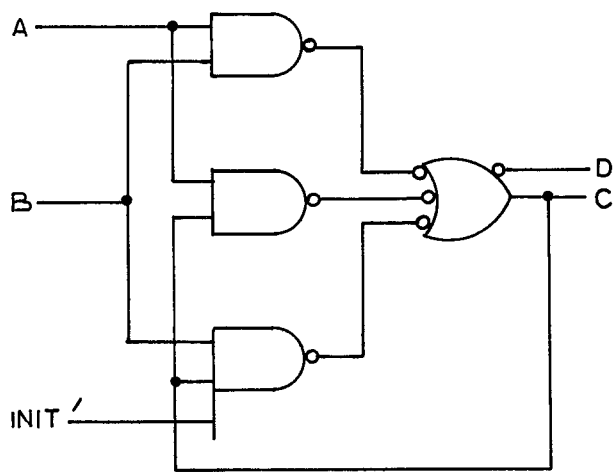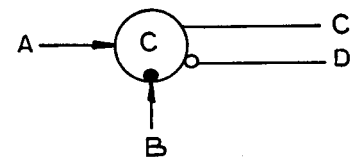
FIG.14D
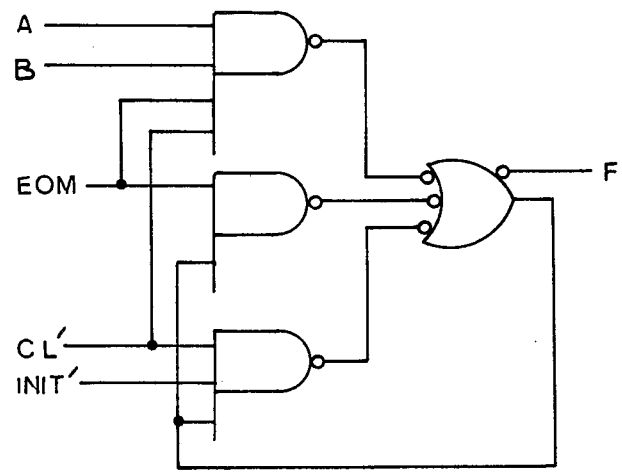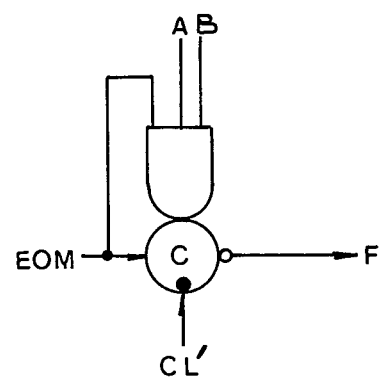
FIG.14E
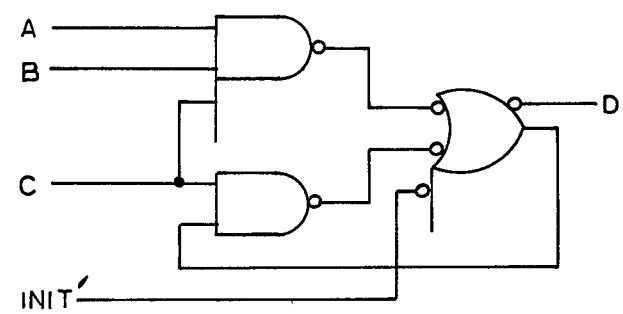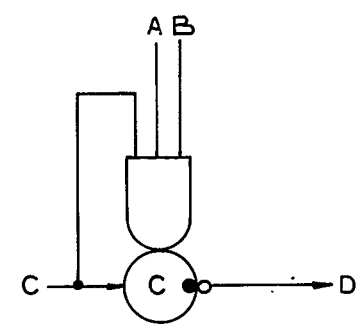
FIG.14F

SPEED INDEPENDENT SELECTOR SWITCH FOR DIGITAL COMMUNICATION NETWORKS

RELATED U.S. PATENT APPLICATIONS

U.S. patent applications directly or indirectly related to the subject application are the following:

Ser. No. 035,314 filed May 2, 1979 by Robert Stanley Barton and Becky Jane Clark and titled Digital Communication Networks Employing Speed Independent Switches; and Ser. No. 035,315 filed May 2, 1979 by Becky Jane Clark and titled Speed Independent Arbiter Switch For Digital Communication Networks.

BACKGROUND OF THE INVENTION

1. Field of the Invention

This invention pertains to networks of digital devices with shared components, which networks in turn may share components at a higher level. The interconnections are constructed from two kinds of speed independent switches call arbiters and selectors.

2. Description of the Prior Art

Prior art information handling systems have incorporated distributed processors and storage units. These can be expanded to accommodate higher storage capacities and data processing throughput. Such distributed systems have required a high degree of centralization of the system control with its associated programming problems.

It is an object of the present invention to provide an improved communication network for a distributed system.

It is another object of the present invention to provide a network for a distributed system wherein control is decentralized to the various units of the system.

It is still a further object of the present invention to provide a communications network for a distributed system which requires minimal or no software control.

SUMMARY OF THE INVENTION

The present invention is a speed independent selection switch designed for pipelined message transmission through digital communication networks. The selector routes a message from the input path to one of two output paths selected by the first bit of the message, that bit then being discarded.

Trees formed from selectors provide distribution to two or more devices from one source.

Networks employing both selectors and arbiters can be formed for the transmission of messages among a number of devices.

BRIEF DESCRIPTION OF THE DRAWINGS

The above and other objects, advantages and features of the present invention will become more readily apparent from a review of the following specifications when taken in conjunction with the drawings wherein:

FIGS. 1A-11 are schematic diagrams of various networks illustrating the present invention;

FIGS. 13A-D are schematic diagrams of the selector switch; and

FIGS. 14A-J are schematic diagrams of various circuits employed in the present invention.

GENERAL DESCRIPTION OF THE INVENTION

Communications in networks connected by arbiter and selector switches are in the form of serially transmitted messages which in the general case consist of three parts: destination address, body, and source address. The source address originates on the path where it is determined by the arbiter switches from the destination to the source. The destination address selects the path through the network to the destination and is used bit-by-bit in the selector switches along that path. In general, as a message moves through a network, an arbiter appends a bit to indicate through which of its two inputs a message entered and a selector removes the leading bit and selects through which of its two outputs the message leaves. A receiving device accepts first the message body and then the source address.

A particular bidirectional communication pattern for a set of two-terminal devices is describable by a net of oriented, directed graphs with ternary nodes. Such a graph is realizable in circuit form with a net of arbiters and selectors isomorphic to the graph.

The converse of an oriented directed graph is obtained by reversing all directions while leaving orientations unchanged. For arbiter-selector nets this requires substituting arbiters for selectors, selectors for arbiters, device inputs for outputs, and outputs for inputs.

FIGS. 1A and 1B show two nets each permitting bidirectional communication between two sets of two devices. In each case the net is separable into two mutually converse nets. (The net of FIG. 1B allows four concurrent paths between the groups while the net of FIG. 1A allows only two concurrent paths).

A net is said to be self-converse if for each directed path connecting a pair of endpoints the converse path exists. The net then has the property that the source address of each path endpoint is the destination address from the other endpoint.

Figure 3:
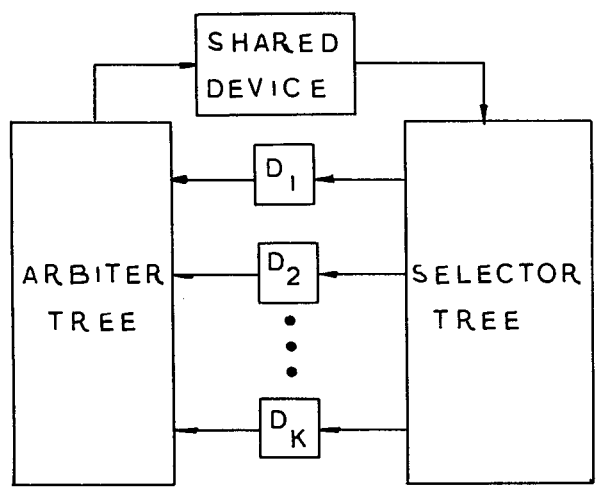

In the case of particular interest for this invention, a two-terminal system component (e.g., store, processor, I-O device, or system) can be shared by two or more devices connected via structurally similar trees of arbiter and selector switches. FIG. 2 illustrates the case for four sharing devices $D_1$, $D_2$, $D_3$, and $D_4$. FIG. 3 shows the general interconnection using trees of arbiters and selectors which have the property of being mutually converse networks.

Figures 4A, 4B:
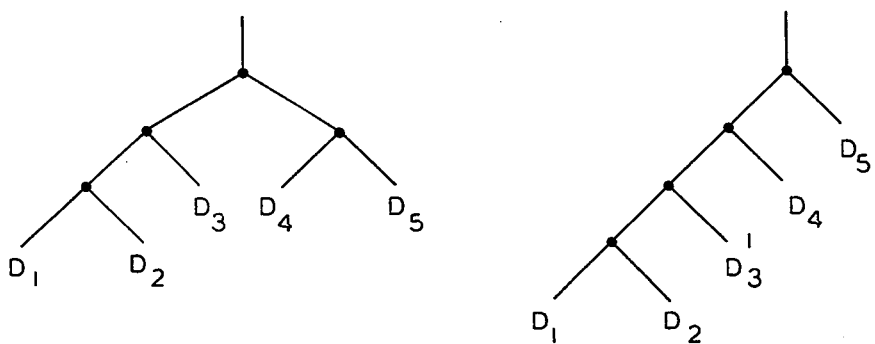

Any number of devices can be connected in this fashion. Since device identifications are generated internally in the arbiter trees and used internally in the selector trees, the spanning tree need not be unique; indeed, it may be determined for convenience in placement of the switches or for minimization of the total length of the interconnecting wires. FIGS. 4A and 4B show two arrangements for five devices.

In this type of network dialogs occur between a shared and sharing devices with a sharing device initiating each dialog. The messages to the shared device have null destination address parts since no selection is required, there being only one destination. The source address will arrive at the shared device appended to the message body. The reply will then use the source address as a destination address. In this way each dialog continues, and network addresses remain anonymous, thus permitting convenient expansion or contraction of the network.

A typical application is a set of computer terminals sharing a central processor or database. Messages may consist of one or more characters. The central system will maintain a queue for each terminal in which messages from that terminal are assembled. All conflicting requests for lines will be resolved by the arbiter trees. Ordering of messages is automatic. Thus the central system has no need for a program to poll terminals or to represent configurations, such functions being accommodated in a decentralized manner in the switches.

A hierarchichal network similar to that familiar from telephone switching can be constructed by using a number of networks of the type shown in FIG. 3. If each network is broken at a device, the output and input connections can be used as the input and output of the network. The resulting two-terminal network can then be used as one of the devices of a similar network at a higher level, thus giving a hierarchical structure.

Figure 5:
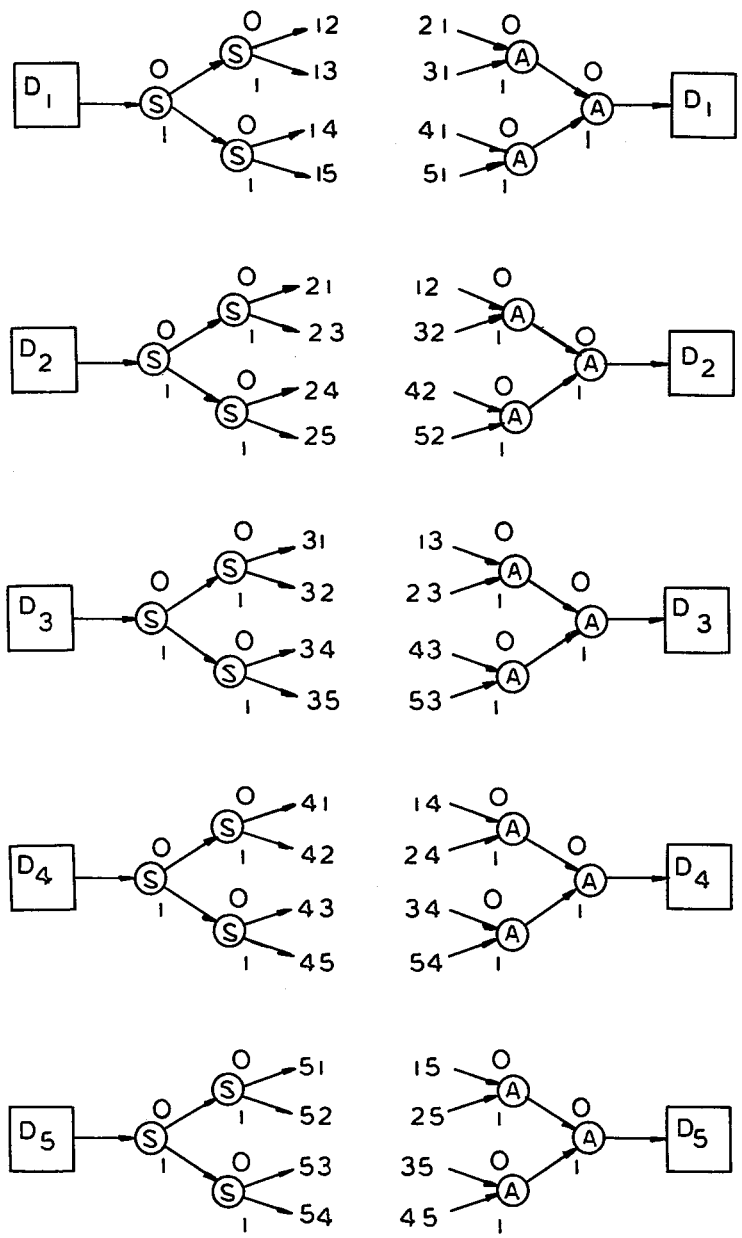

Another class of networks of interest is those networks where each device is connected symmetrically to some of the other devices. The networks of this form which give the maximum number of concurrent paths are those in which the device outputs are each connected to the root node of a selector tree and the device inputs are each connected to the root node of an arbiter tree with the leaf nodes of the trees connected to each other in such a manner that the network is self-converse. An example of this type of network where each of five devices is connected to the other four is shown in FIG. 5. When the trees are homogeneous, as in FIG. 5, all paths have equal priority, and all devices can be used concurrently if there is no conflict. This type of network is similar to conventional crossbars. If the trees used are not homogeneous, the shorter paths through the arbiter trees will have greater priority since under heavy loading an arbiter accepts messages alternately from its two inputs.

Figure 6:
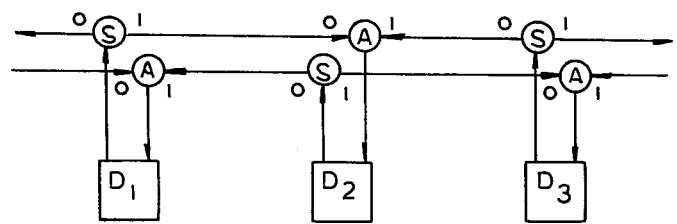
Figure 7:
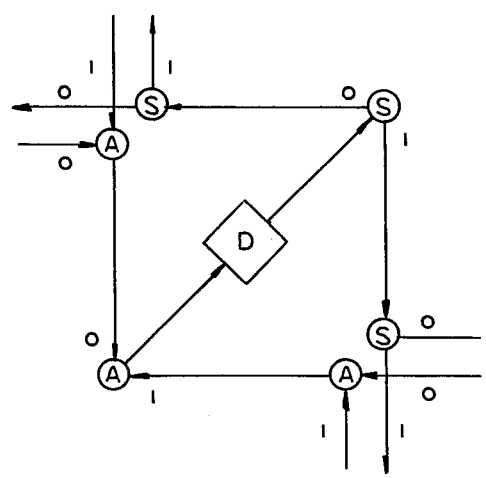

There are several special cases of the above class of networks which are of interest. The network of FIG. 6 connects each device to its two neighbors giving a linear array of devices. FIG. 7 shows the network associated with a device which can communicate with any of four neighbors. This interconnection gives a two dimensional array of devices.

Figure 8:
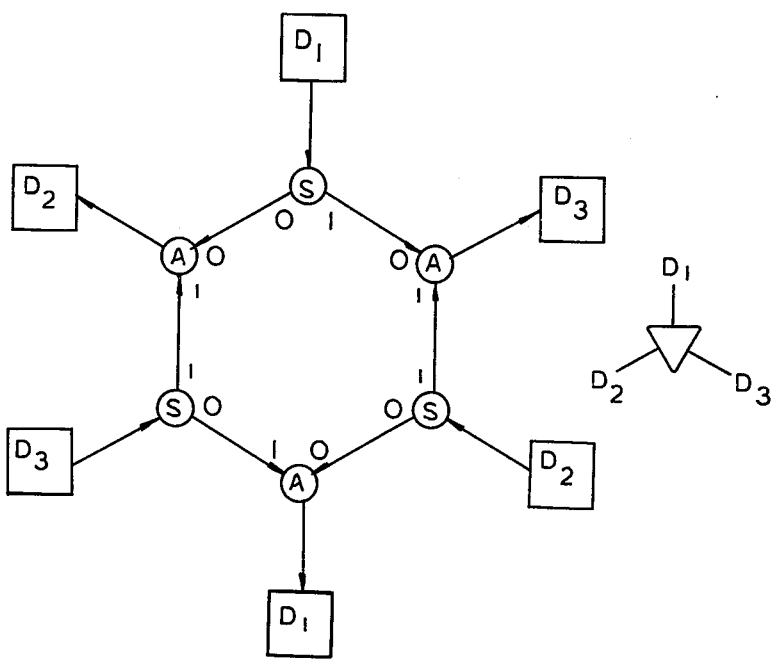
Figure 9:
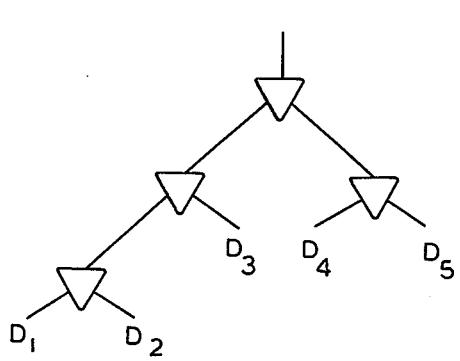
Figure 10:
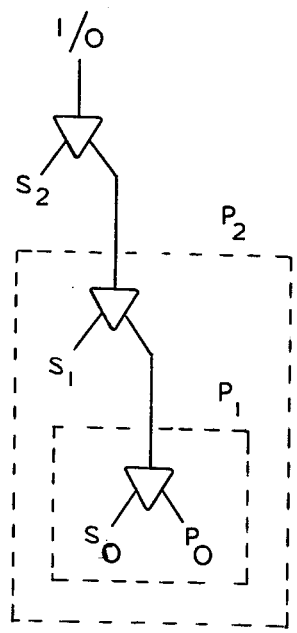

The case where each of three devices is connected to the other two is shown in FIG. 8. This hexagonal connector is of special interest since a number of these connectors can be placed at the nodes of a tree and interconnected with the devices at the leaf nodes. This type of network, an example of which is shown in FIG. 9, allows commmunication between any of the devices at the leaf nodes with higher priority given to those paths with shorter addresses. The network allows the maximum number of concurrent paths possible without redundancy, but the probability of conflict is higher than in the networks described above with the arbiters and selectors grouped into separate trees. The number of switches required, however, is substantially smaller for the tree of hexagonal connectors. An example of how this type of network might be used is the hierarchy of processors and stores shown in FIG. 10.

Figure 11:
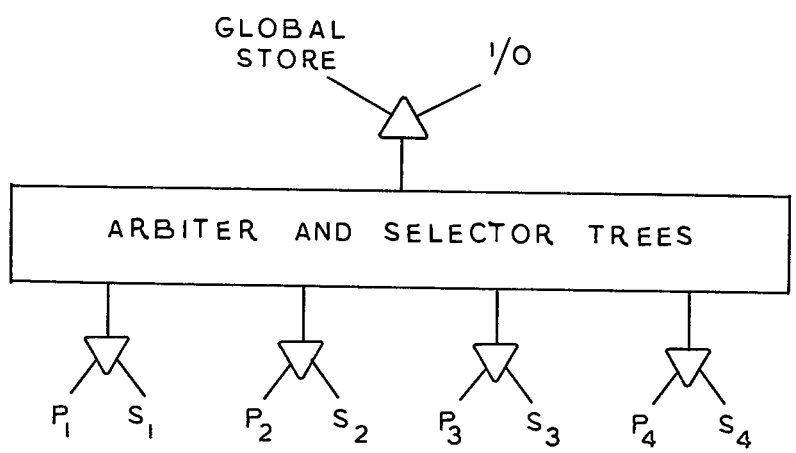

Networks need not be constructed symmetrically or solely of one type of connector. FIG. 11 shows a network using the arbiter and selector trees of FIG. 3 and the hexagonal connector of FIG. 8 to connect a number of processor and store pairs with a global store and an input/output device.

DESCRIPTION OF THE ARBITER SWITCH

Figure 12:
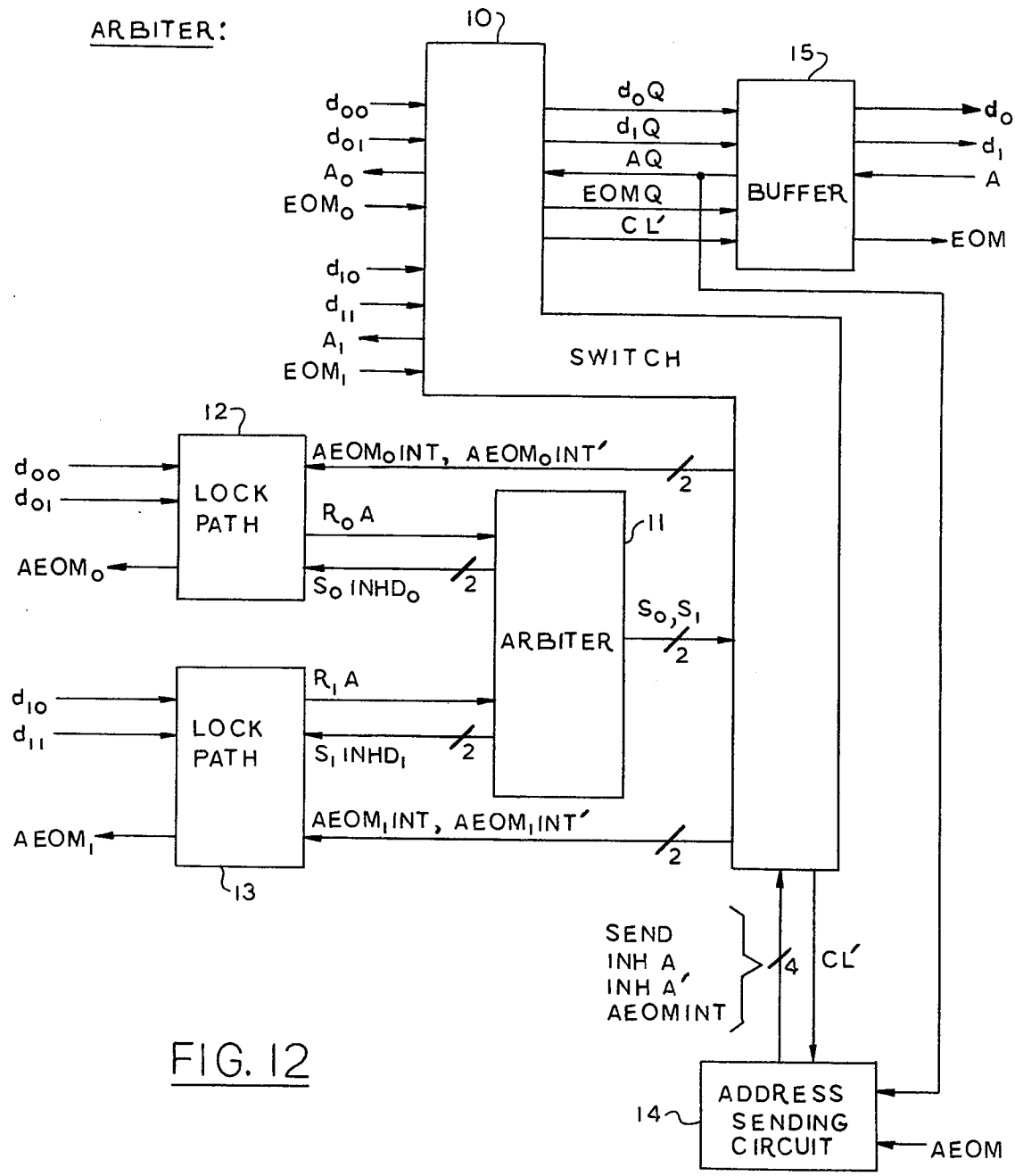
FIG. 12 is a schematic diagram of the arbiter switch.

The arbiter switch will now be described in relation to FIG. 12. As illustrated in FIG. 12 the arbiter switch includes switch circuit 10, arbiter circuit 11, lock path circuits 12 and 13, address sending circuit 14 and buffer circuit 15.

It is to be remembered that the arbiter switch receives message signals from two different stations or nodes, determines which of the messages is to be transmitted and then transmits that message through the arbiter switch, adding an address bit at the end of the message to indicate which of the two sending nodes transmitted the signal.

Switch circuit 10 receives either data signals $d_{00}$, $d_{01}$, or $d_{10}$, $d_{11}$ as well as the end of message signals $EOM_x$, ($x=0,1$) from one or the other transmitting station and also returns an acknowledge signal $A_x$ to that station. The respective data signals are also received by corresponding lock path circuits 12 and 13 as will be more thoroughly described below. When such data signals are received by a particular lock path circuit, that circuit transmits a request signal $R_xA$ to arbiter circuit 11 and when such a request has been accepted, arbiter circuit 11 sends a set signal $S_x$ to switch circuit 10 to set switch circuit 10 to that path for subsequent passage of the transmitted message to buffer 15. After the transmission of the message, address sending circuit 14 adds an address bit to the end of the message to indicate which previous node transmitted the message.

DESCRIPTION OF THE SELECTOR SWITCH

Figure 13A:
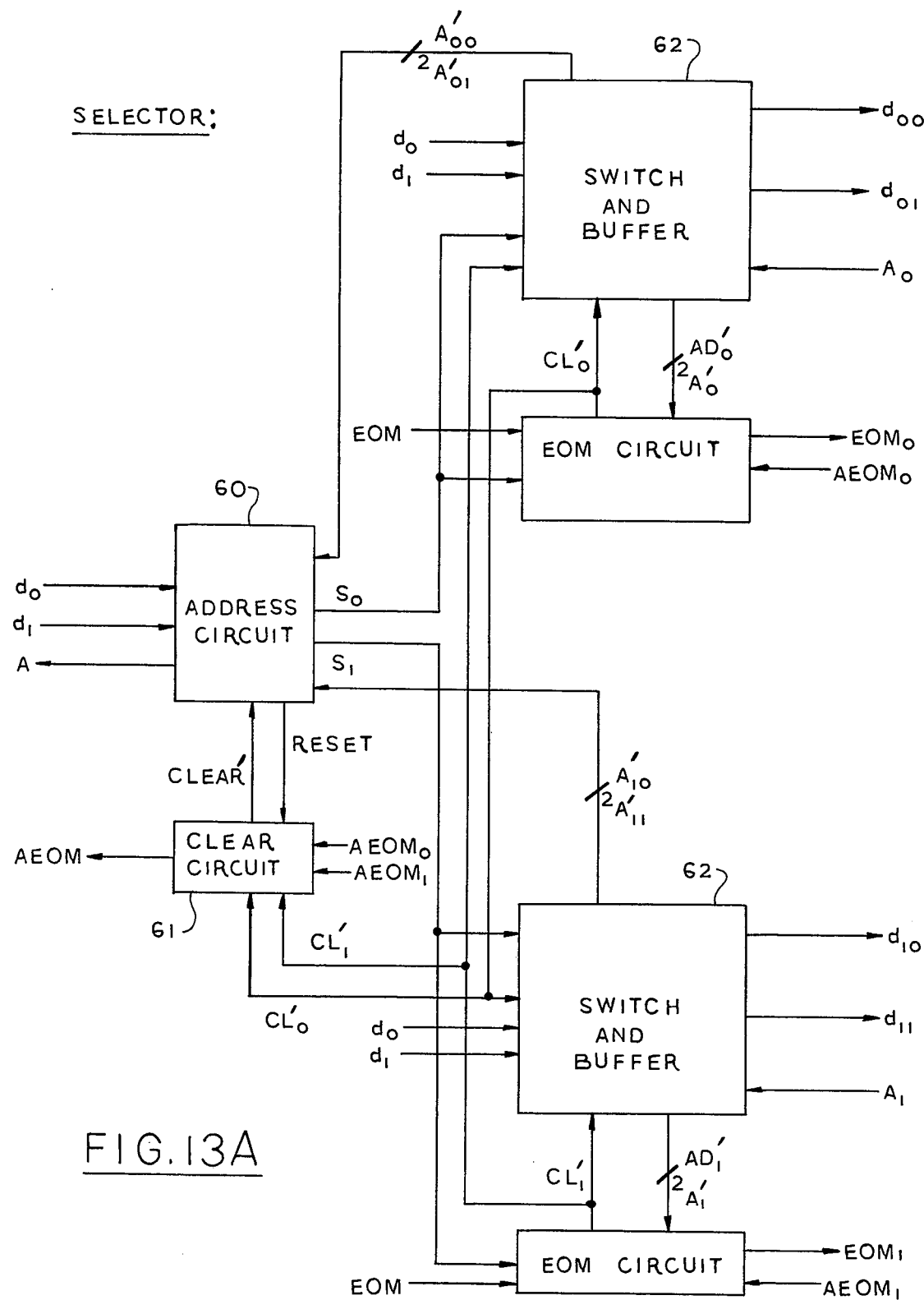

The selector switch will now be described in relation to FIGS. 13A–D. As illustrated in FIG. 13A, the selector switch includes address circuit 60, clear circuit 61, as well as a pair of switch and buffer circuits 62 each with an end of message EOM circuit. The function of the selector switch is to receive messages having a leading address from another station or node and to determine to which of two stations or nodes the message is to be transmitted depending upon the first bit in the address. The first bit in the address sets the circuit path and the rest of the bits are transmitted to the same node unitl completion of the message is detected and the circuit is cleared. The first bit will then be removed from the address of the following message and the selector path set accordingly.

Figure 14G:
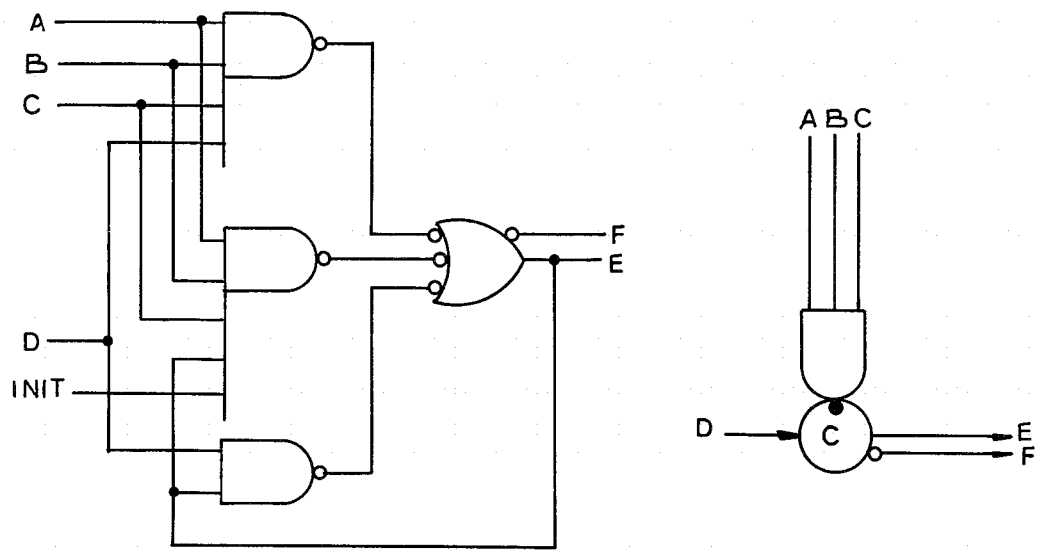
Figure 14H:
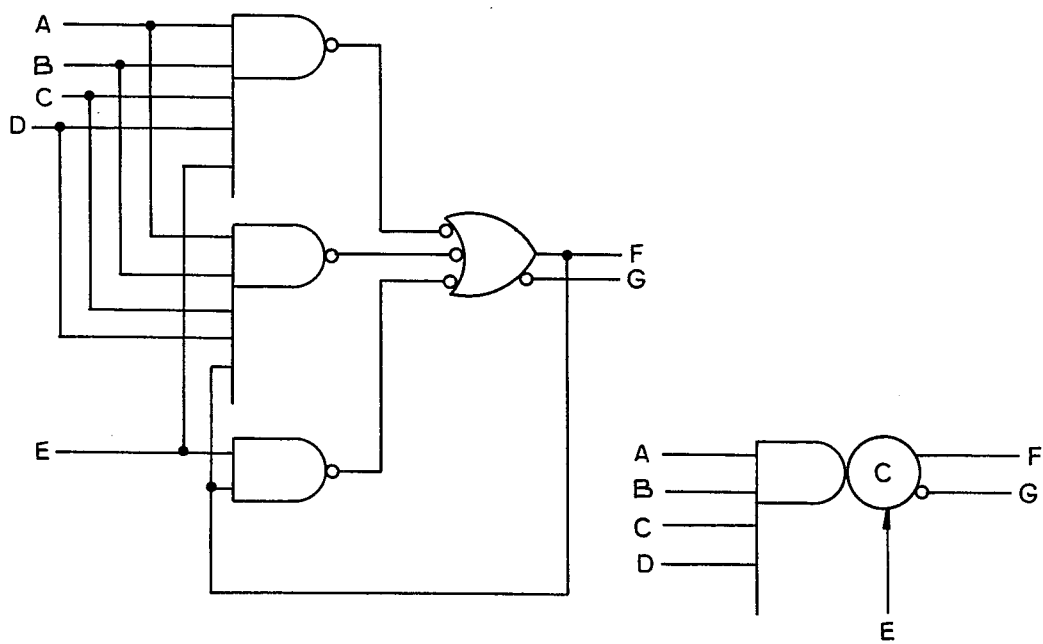
Figure 14I:
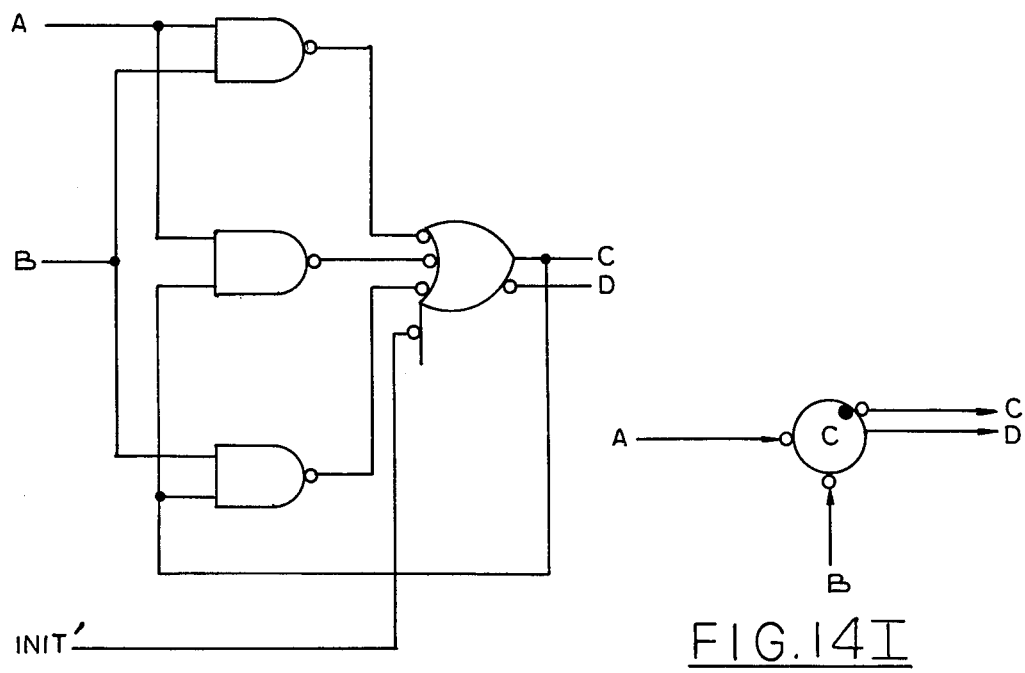
Figure 14J:
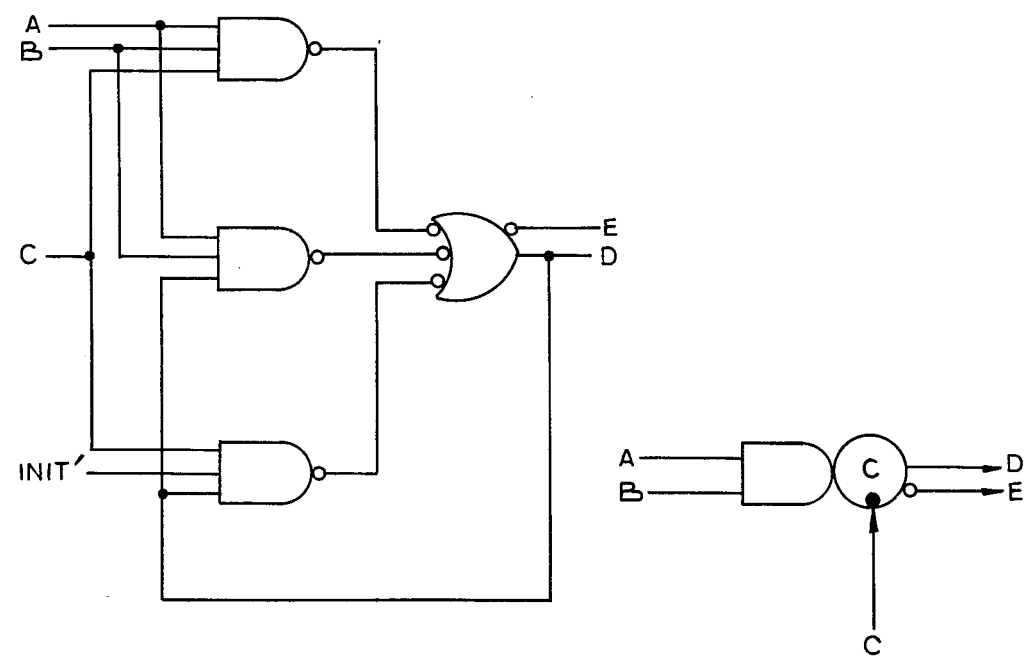

Address circuit 60 of FIG. 13A is illustrated in FIG. 13B and includes two sets of C-elements 66 and 67. C-elements 66 receive the incoming data signals $d_0$ and $d_1$ by way of NAND gates 65. NAND gates 65 also receive an inverted reset signal from gate 68. C-elements 66 receive a reset signal and transmit set signals $ASET_0$ and $ASET_1$ to C-elements 67. In addition, C-elements 67 receive an inverted clear signal and transmit the set to path signals $S_0$ and $S_1$ to the respective switch and buffer circuits 62 of FIG. 13A. Gate 68 transmits a reset signal to the clear circuit in the selector switch. Depending upon the state of the set to path signals $S_0$ and $S_1$, one of the two switch and buffer circuits will select the incoming data signals $d_0$ and $d_1$ for transmission to the next node. C-elements 66 and 67 are illustrated in detail in FIGS. 14I and 14J respectively.

Clear circuit 61 of FIG. 13A is illustrated in FIG. 13C and includes C-element 74 which receives a gated acknowledge end of message signal $AEOM_x$, from the node to which the message has been transmitted. C-element 74 also receives a reset signal from address circuit 60 of FIG. 13A and produces the acknowledge end of message signal, AEOM, which is transmitted to the station or node from which the message was received. This signal is also sent to NAND gate 75 as is the true output of AND/NAND gate 76. The output of gate 75 is an inverted clear signal that is transmitted to address circuit 60 of FIG. 13A. C-element 74 is disclosed in FIG. 14D.

Figure 13D:
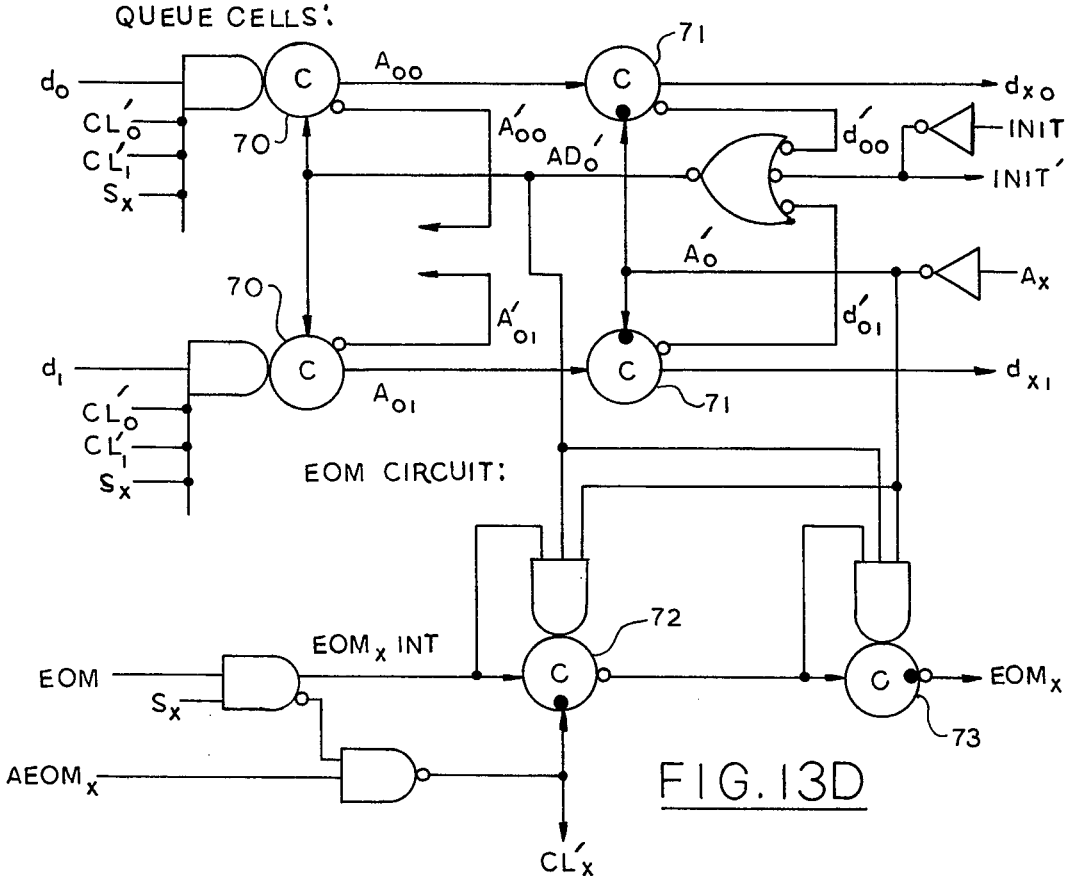

Switch and buffer circuits 62 are illustrated in FIG. 13D and each serves as a two cell queue with storage for one bit of data. It is this gueue which allows pipelining of data through the switches. This buffer will not be described in detail except to say that it receives the incoming data signals $d_0$ and $d_1$ as well as the end of message signal EOM and, upon selection of particular buffer, transmits those signals as data signals $d_{x0}$, $d_{x1}$ and end of message signal $EOM_x$. C-elements 70, 71, 72 and 73 are illustrated in FIGS. 14H, 14D, 14E and 14F respectively.

EPILOGUE

As described above, the present invention is a speed independent selection switch for pipelined message transmission through digital communication networks.

While but one embodiment of the present invention has been disclosed, it will be obvious to those skilled in the art that variations and modifications may be made therein without departing from the spirit of the scope of the invention as claimed.

What is claimed is:

1. A selection switch for receiving signals from a node of a digital communication network and transmitting those signals to one of two other nodes, said switch comprising:
   a pair of switch circuits, each adapted to receive a set of said data signals;
   an address circuit to receive said data signals preceded by an address signal specifying which of two nodes is to be selected for subsequent transmission and to signal the corresponding one of said switch circuits; and
   said address circuit includes means to remove the first address bit of the address upon selection of one of the pair of switch circuits.

2. A selection switch according to claim 1 further including:
   a plurality of buffer circuits each connected to one of said switch circuits each of said buffer circuits including a two cell queue to receive a data bit from the switch means in the first cell and transfer that bit to the second cell only when the second cell is empty, such buffer circuit enabling pipelining through connected switches.

3. A selector switch according to claim 1 further including:
   a pair of end of message circuits, one for each of said switch circuits to receive an end of message signal subsequent to the receipt of a data signal.

4. A selection switch according to claim 3 further including:
   a clear circuit adapted to receive an acknowledge end of message signal from the selected node and to transmit that signal to the original node.

* * * * *